(12) United States Patent
Satoh et al.

(10) Patent No.: US 6,444,359 B1
(45) Date of Patent: Sep. 3, 2002

(54) LIQUID ELECTROLYTE SOLUTION INCLUDING A HALOGENATED AND ALIPHATIC POLYOLEFIN DISSOLVED THEREIN AND SECONDARY BATTERY

(75) Inventors: Masaharu Satoh; Hiroshi Yageta; Yutaka Bannai; Masato Shirakata, all of Tokyo; Norihide Ohyama, Tochigi; Tomokazu Kumeuchi, Tokyo, all of (JP)

(73) Assignees: NEC Corporation, Tokyo (JP); NEC Moli Energy Corporation, Tochigi (JP)

( * ) Notice: Subject to any disclaimer, the term of this patent is extended or adjusted under 35 U.S.C. 154(b) by 0 days.

(21) Appl. No.: 09/460,768

(22) Filed: Dec. 14, 1999

(30) Foreign Application Priority Data

Dec. 18, 1998 (JP) .............................................. 10-361002
Mar. 29, 1999 (JP) .............................................. 11-086543

(51) Int. Cl.[7] .......................... H01M 6/16; H01M 10/08

(52) U.S. Cl. ........................................ 429/199; 429/189

(58) Field of Search ................................. 429/199, 309, 429/316, 321, 322, 189

(56) References Cited

U.S. PATENT DOCUMENTS

| | | | | |
|---|---|---|---|---|
| 5,296,318 A | * | 3/1994 | Gozdz | 429/192 |
| 5,656,392 A | * | 8/1997 | Sano et al. | 429/194 |

FOREIGN PATENT DOCUMENTS

| | | |
|---|---|---|
| JP | 4-349366 | 12/1992 |
| JP | 7-263026 | 10/1995 |
| JP | 7-320780 | 12/1995 |
| JP | 8-162132 | 6/1996 |
| JP | 10-334945 | 12/1998 |
| JP | 10-334946 | 12/1998 |
| JP | 10-334947 | 12/1998 |
| JP | 11-16604 | 1/1999 |
| JP | 11-66948 | 3/1999 |
| JP | 11-67274 | 3/1999 |
| JP | 11-162513 | 6/1999 |

\* cited by examiner

*Primary Examiner*—Patrick Ryan
*Assistant Examiner*—Mark Ruthkosky
(74) *Attorney, Agent, or Firm*—Young & Thompson

(57) ABSTRACT

In a secondary battery wherein a positive electrode active material layer 2 and a negative electrode active material layer 3 are allowed to face each other via a liquid electrolyte solution 1, there is used, as the electrolyte solution 1, a basic solvent containing a halogenated polyolefin and an aliphatic polyolefin dissolved therein.

6 Claims, 2 Drawing Sheets

LIQUID ELECTROLYTE SOLUTION INCLUDING A HALOGENATED AND ALIPHATIC POLYOLEFIN DISSOLVED THEREIN AND SECONDARY BATTERY

BACKGROUND OF THE INVENTION

1. Field of the Invention

The present invention relates to an electrolyte solution, a secondary battery using the electrolyte solution, and a secondary battery using a plastisol as a liquid electrolyte.

2. Description of the Related Art

As the market for notebook personal computer, portable telephone, etc. has expanded rapidly, the requirement for batteries used therein, having a high output and excellent stability has increased. To respond to the requirement, there have been developed secondary batteries which use an alkali metal ion (e.g. lithium ion) as a charge carrier and utilize an electrochemical reaction associated with the donation and acceptance of the above ion.

Such batteries using an alkali metal ion need to use a non-aqueous electrolyte solution and, therefore, have had a possibility of reduced battery properties caused by liquid leakage and vaporization. Hence, there have been used, as the solvent for the electrolyte solution, high-boiling basic solvents such as ethylene carbonate, propylene carbonate, diethyl carbonate, dimethyl carbonate, γ-butyrolactone and the like, singly or in combination. With these solvents, however, it has been impossible to completely eliminate the possibility of reduced battery properties caused by liquid leakage and/or vaporization. A stable and highly safe electrolyte solution has been required also for electrochemical apparatuses such as electric double layer capacitor, electrolytic capacitor, various sensors and the like; however, no completely satisfactory electrolyte solution has been developed.

Secondary batteries using a liquid electrolyte have, in some cases, a structure in which an active material layer for positive electrode and an active material layer for negative electrode are separated by a separator made of a porous film and the resulting combination of two electrodes and a separator is wound a plurality of times or piled in a plurality of layers. A liquid electrolyte is introduced between the positive electrode and the negative electrode. In such batteries, the film-shaped separator has functions of (1) preventing the contact of two electrode active materials with each other and (2), when, for example, an abnormally large current flows and Joule's heat is generated, melting and plugging the pores which are the passages of ion. In recent years, as electronic appliances have become smaller and come to possess a higher performance, the secondary batteries used therein have become smaller and come to possess a higher output and a higher capacity; therefore, when short-circuiting arises in the batteries, a large current may be generated and may break the film-shaped separator of battery. In recent years, in response to the requirement for smaller battery, there has come to be often employed a thin battery having such a structure that a combination of a positive electrode active material layer, a negative electrode active material layer and a separator is wound a plurality of times and then crushed. In such a battery, however, the separator receives a large pressure and breaks very easily. The breakage of separator may invite short-circuiting and make charging impossible, or may produce firing or fuming. Therefore, in such a battery, it has been necessary as a measure for possible short-circuiting, to provide a protective circuit or a fuse at the outside of the battery. Thus, in secondary batteries which use a liquid electrolyte and wherein a positive electrode and a negative electrode are separated from each other by a separator film, there have been rooms for improvement, as mentioned above.

Meanwhile, it has been investigated to use a solvent-free polymer solid electrolyte or a polymer gel electrolyte low in solvent content, in order to prevent the reduction in battery properties caused by liquid leakage and vaporization and further prevent the occurrence of short-circuiting and the firing or fuming caused by heat generation. In such a battery constitution, no separator film is required and, therefore, the breakage of separator film and resultant occurrence of short-circuiting, etc. can be eliminated. As the polymer solid electrolyte, there are known those obtained by dissolving a metal salt in a polymer having a polyether segment (e.g. polyethylene oxide) or in a crosslinking product of the polymer.

In U.S. Pat. No. 4,303,748 is disclosed an electricity-generating device of charge and discharge type, which uses, as the electrolyte, a solid solution obtained by dissolving an ionic substance in a polymer having an ethylene oxide main chain. In JP-A-8-7924 is disclosed an ion-conductive polymer obtained by crosslinking a polymer having a polyether segment, with acryloyl group or the like. Further, investigations have been made on polymer gel electrolytes wherein a polymer is allowed to contain an organic solvent for improved ionic conductivity. For example, in JP-B-61-23947 is disclosed a polymer gel electrolyte comprising a polymer (e.g. polyvinylidene fluoride), a group I or II metal salt and an organic solvent having solubility for both the polymer and the metal salt. In U.S. Pat. No. 5,296,318 is disclosed a polymer gel electrolyte obtained by impregnating a hexafluoropropylene-vinylidene fluoride copolymer film with a solution (an organic solvent containing a lithium salt). Also in JP-A-5-109310 is disclosed a method for producing a complex wherein an alkali metal-containing solution is infiltrated into the inside of a crosslinked polymer, by mixing a polymer having a crosslinkable polyether segment, an alkali metal salt and a solvent capable of dissolving the metal salt, molding the mixture, and applying a light, a radiation or the like to the molded material to give rise to crosslinking. Investigations have also been made on polymer gel electrolytes using a combination of two or more kinds of polymers. For example, in JP-A-58-75779 is disclosed a battery constituted by at least one kind of polymer selected from a polyvinylidene fluoride, a polymethyl methacrylate and other particular polymers, a lithium salt, a particular organic solvent, a metal lithium negative electrode and a positive electrode consisting of a particular inorganic compound. In JP-A-9-971618 is disclosed a polymer gel electrolyte obtained by preparing a mixture or solution of a polymer sparingly soluble in an organic electrolytic solution and a polymer soluble in the organic electrolytic solution, making the mixture or solution into a polymer alloy film, and impregnating the film with the organic electrolytic solution to give rise to gelation. Therein are shown, as an example of the polymer sparingly soluble in the organic electrolytic solution, a polyvinylidene fluoride and, as an example of the polymer soluble in the organic electrolytic solution, a polyethylene oxide. In these polymer solid electrolytes and polymer gel electrolytes, however, as compared with liquid electrolytes, ionic conductivity is low and it is difficult to obtain a high output.

As mentioned above, with a liquid electrolyte, although a high ionic conductivity is obtained, it is difficult to completely eliminate the possible liquid leakage and vaporization from the very small flaws of sealed container. Therefore, in batteries which use an alkali metal ion as a charge carrier and wherein a positive electrode and a negative electrode are adjacent via an electrolytic solution, it has been impossible to completely eliminate the possible reduction in battery properties, caused by liquid leakage and vaporization; further, there has been a risk that the separator film breaks easily and short-circuiting takes place between the positive electrode and the negative electrode, making charging impossible and inducing firing or fuming.

Meanwhile, with polymer solid electrolytes containing no solvent or with polymer gel electrolytes containing a solvent in a low concentration, although the risk of short-circuiting is low, no sufficiently high ionic conductivity is obtained, making it difficult to obtain a secondary battery of high output.

In view of the above situation, it is an object of the present invention to provide a secondary battery which is free from liquid leakage and vaporization, maintains sufficiently high ionic conductivity, hardly causes short-circuiting or the like, and is highly stable.

SUMMARY OF THE INVENTION

According to the present invention, there is provided an electrolyte solution consisting of a basic solvent containing an alkali metal salt and a halogenated polyolefin both dissolved therein.

According to the present invention, it is possible to obtain an electrolyte solution high in ionic conductivity and excellent in stability and safety. Containing an alkali metal salt and a halogenated polyolefin both dissolved, the present electrolyte solution is substantially free from liquid leakage or vaporization and has high ionic conductivity.

According to the present invention, there is also provided a secondary battery using an alkali metal ion as a charge carrier and having a structure in which a positive electrode and a negative electrode are adjacent to each other via an electrolyte solution, in which secondary battery the electrolyte solution consists of a basic solvent containing an alkali metal salt and a halogenated polyolefin both dissolved therein.

Using the above-mentioned electrolyte solution of the present invention, the above secondary battery has a high output density and high safety.

According to the present invention, there is further provided a secondary battery having a structure in which a positive electrode layer and a negative electrode layer are laminated via a separator and a liquid electrolyte is allowed to be present between the positive electrode layer and the negative electrode layer, in which secondary battery the liquid electrolyte is a plastisol containing an electrolyte salt.

According to the present invention, there is also provided a process for producing a secondary battery, which comprises:

a step of laminating a positive electrode layer and a negative electrode layer via a separator, a step of introducing a plastisol containing an electrolyte salt, between the positive electrode layer and the negative electrode layer, a step of applying a voltage between the positive electrode layer and the negative electrode layer to heat part of the plastisol, and a step of cooling the plastisol.

The above secondary battery is characterized in that it uses a plastisol as a liquid electrolyte. "Plastisol" refers to a paste-like sol having fluidity, obtained by dispersing a thermoplastic resin powder in a plasticizer, as defined in, for example, "New Polymer Dictionary (edited by Polymer Dictionary-Editing Committee of The Society of Polymer Science, Japan, published from Asakura Shoten in 1988)". In the plastisol, the most part of the thermoplastic resin powder is not dissolved and is dispersed in the plasticizer. When the plastisol is heated to a certain temperature or higher, the thermoplastic resin powder dissolves in the plasticizer and, when the plastisol is then cooled, a polymer gel is formed. This unique property of plastisol is utilized in the present invention.

Being a liquid electrolyte, the plastisol has high ionic conductivity as compared with a gel or solid electrolyte. As mentioned previously, in secondary batteries using a conventional liquid electrolyte, Joule's heat is generated when an abnormally large current flows inside the battery, causing separator' breakage, etc. In contrast, in the secondary battery of the present invention using a plastisol which becomes a gel upon generation of Joule's heat, a polymer gel is formed at the sites where an abnormally large current flows. By the formation of this polymer gel, the sites where breakage tends to occur, are reinforced, and the sites already having breakage are automatically repaired; and the short-circuiting inside battery can be effectively prevented when an abnormally large current appears. Thus, in spite of using a liquid electrolyte, good stability and good safety can be realized in the present secondary battery.

Moreover, since the plastisol has a low vapor pressure and a high viscosity as compared with ordinary liquid electrolytes, there is neither leakage nor vaporization of electrolytic solution; therefore, from this point as well can be achieved improvement in stability and safety.

The process for production of secondary battery according to the present invention is characterized in that it uses a plastisol as a liquid electrolyte and has a step of applying a voltage between a positive electrode layer and a negative electrode layer to heat part of the plastisol. In a state that a voltage is applied between the electrodes, a current density distribution appears in the separator, microscopically speaking. The sites of high current density correspond to sites which easily break during the use of battery; at such sites, Joule's heat appears and the plastisol becomes a solution. Hence, by conducting cooling after the above step, a polymer gel is formed selectively at the above sites and reinforcement of the sites is made. In this case, only part of the plastisol becomes a polymer gel and the most part of the plastisol maintains a sol form and constitutes the electrolyte of secondary battery. The plastisol constituting the electrolyte of secondary battery functions, as mentioned previously, so as to prevent the breakage of separator when an abnormally large current flows.

Thus, the secondary battery produced by the process of the present invention, using a plastisol as an electrolyte has not only a self-repairing function but also a function of beforehand reinforcing sites of separator which may easily break, and can effectively prevent the breakage of separator which may occur when an abnormally large current flows.

DETAILED DESCRIPTION OF THE PREFERRED EMBODIMENTS

Figure 1:
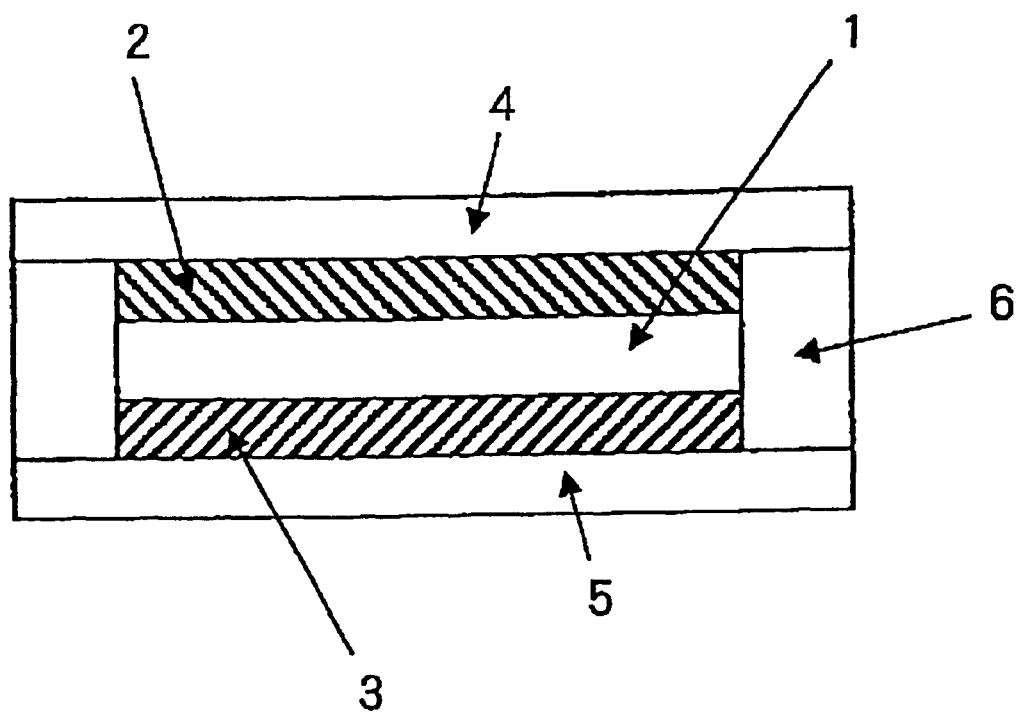
FIG. 1 is a sectional view showing an example of the constitution of the secondary battery of the present invention.

First, description is made on the electrolyte solution consisting of a basic solvent containing an alkali metal salt and a halogenated polyolefin both dissolved therein, as well as on the battery using the electrolyte solution.

In the present invention, the halogenated polyolefin is a polyolefin having halogen substituent such as F, Cl, Br or the like, and is preferably a fluorinated polyolefin such as polyvinylidene fluoride, polyhexafluoropropylene, polytetrafluoroethylene or the like from the standpoint of the stability, and particularly preferably a copolymer containing a tetrafluoroethylene. In the present invention, the fluorinated polyolefin includes a copolymer, a graft copolymer and a block copolymer all containing repeating units of fluorinated olefin, and composite materials of one of these copolymers and other polymer. The copolymer containing a tetrafluoroethylene includes a copolymer, a graft copolymer and a block copolymer all containing at least repeating units of tetrafluoroethylene, and composite materials of one of these copolymers and other polymer.

In the present invention, the basic solvent has no particular restriction as to the kind as long as it is a proton-accepting solvent, but a non-aqueous basic solvent is preferred from the standpoint of the effect of the present invention. Examples of the basic solvent are ethylene carbonate, propylene carbonate, dimethyl carbonate, diethyl carbonate, methyl ethyl carbonate, γ-butyrolactone, N,N'-dimethylformamide, dimethyl sulfoxide, N-methylpyrrolidone and m-cresol. In the present invention, these solvents can be used singly or in combination of two or more kinds.

The electrolyte solution of the present invention is a solution of an alkali metal salt and a halogenated polyolefin dissolved in a basic solvent, and, since being a solution, has a feature of having high ionic conductivity as compared with gel or solid electrolytes. Further, the electrolyte solution of the present invention, as compared with an electrolyte solution containing no halogenated polyolefin, has about the same ionic conductivity but has low vapor pressure and high viscosity; therefore, has a feature of causing substantially no liquid leakage or vaporization. Hence, in the electrolyte solution of the present invention, it is necessary that at least part of the halogenated polyolefin is dissolved completely, and it is preferred that no part of the halogenated polyolefin is in a gel or solid form. From this standpoint, the concentration of the halogenated polyolefin is preferably 0.1 to 20% by weight. When the concentration of the halogenated polyolefin is smaller than 0.1% by weight, the effect of reduced vapor pressure and increased viscosity is small. When the concentration is larger than 20% by weight, gelation or solidification proceeds easily and it is difficult to obtain stability. In the present invention, an aliphatic polyolefin may be used in order to increase the solubility of halogenated polyolefin and the stability of halogenated polyolefin solution. As the aliphatic polyolefin, there can be mentioned straight chain or branched chain saturated or unsaturated hydrocarbon compounds. From the standpoint of the effect of the present invention, a saturated hydrocarbon having a carbon chain length of 6 to 24 is preferred. When the carbon chain length is 5 or smaller, the aliphatic polyolefin per se has a vapor pressure, reduces the viscosity of solution, and does not increase the stability of halogenated polyolefin solution. When the carbon chain length is 25 or larger, the aliphatic polyolefin allows the electrolyte solution to cause gelation and have reduced ionic conductivity. A concentration of the aliphatic polyolefin larger than that of the halogenated polyolefin impairs the ionic conductivity of electrolyte solution; therefore, the concentration of the aliphatic polyolefin is preferably smaller than that of the halogenated polyolefin.

As to the process for production of the electrolyte solution of the present invention, there is no particular restriction. The present electrolyte solution can be produced by adding a basic solvent to an alkali metal salt and a halogenated polyolefin and giving rise to dissolution, or by dissolving an alkali metal salt and a halogenated polyolefin separately in a basic solvent and mixing the two solutions, or by dissolving a halogenated polyolefin in a basic solvent and then adding thereto an alkali metal salt. The electrolyte solution can also be produced by dissolving a halogenated polyolefin in a low-boiling organic solvent such as tetrahydrofuran or the like, then adding a high-boiling basic solvent, and removing the low-boiling solvent alone by vacuum distillation or the like. In the present invention, there is no particular restriction, either, as to the method for dissolving the halogenated polyolefin, etc., and it is possible to use an ordinary means such as agitating blade, homogenizer or the like. It is also possible to conduct dissolution while applying an ultrasonic wave or at a high temperature and a high pressure using an autoclave.

The secondary battery of the present invention has a structure in which at least an positive electrode and a negative electrode are adjacent via an electrolyte solution, and uses an alkali metal ion (e.g. Li ion) as a charge carrier. The secondary battery is characterized in that the electrolyte solution consists of a basic solvent containing an alkali metal salt and a halogenated polyolefin both dissolved therein.

In the secondary battery of the present invention, there is no particular restriction as to the positive electrode active material as long as it absorbs positive ion or releases negative ion during discharge. As the positive electrode active material in the present invention, there can be used known positive electrode active materials for secondary battery, such as metal oxide (e.g. $LiMnO_2$, $LiMn_2O_4$, $LiCoO_2$ or $LiNiO_2$), conductive polymer or its derivative (e.g. polyacetylene, polyaniline, polypyrrole, polythiophene or polyparaphenylene), disulfide compound represented by general formula $(R—S_m)_n$ (R is an aliphatic or aromatic hydrocarbon; S is sulfur; m is an integer of 1 or larger; and n is an integer of 1 or larger) (e.g. dithioglycol, 2,5-dimercapto-1,3,4-thiadiazole or S-triazine-2,4,6-trithiol), and the like. In the present invention, the positive electrode active material may be mixed with an appropriate binder and/or an appropriate functional material to form a positive electrode. As the binder, there can be mentioned, for example, a halogen-containing polymer such as polyvinylidene fluoride or the like. As the functional material, there can be mentioned a conductive polymer for securing electronic conductivity (e.g. acetylene black, polypyrrole or polyaniline), a polymer electrolyte for securing ionic conductivity, a composite material thereof, etc. In the secondary battery of the present invention, there is no particular restriction as to the negative electrode active material as long as it can occlude and release cation. As the negative electrode active material, there can be used those negative electrode active materials for secondary battery, such as natural graphite, crystalline carbon (e.g. graphitized carbon) obtained by treating coal, petroleum pitch or the like at high temperatures), amorphous carbon obtained by heat-treating coal, petroleum pitch coke, acetylene pitch coke or the like, metallic lithium, lithium alloy (e.g. AlLi) and the like.

In the secondary battery of the present invention, it is possible to use a thin-film or reticulate collector composed of stainless steel, copper, nickel, aluminum or the like. It is also possible to use, as in conventional batteries, a separator consisting of a porous thermoplastic resin film or the like, between the positive electrode and the negative electrode.

The secondary battery of the present invention can be used in a form of cylinder, prism, coin, sheet or the like, but the form is not restricted thereto. There is no particular restriction, either, as to the process for production of the secondary battery of the present invention. The present secondary battery can be produced by a known process for production of secondary battery, for example, by winding a positive electrode sheet, a separator, a negative electrode sheet, etc. a plurality of times, inserting the wound material into a case, dropping thereinto the electrolyte solution of the present invention, and conducting sealing.

The electrolyte solution of the present invention is constituted by a basic solvent containing an alkali metal salt and a halogenated polyolefin both dissolved therein. Containing a halogenated polyolefin, the electrolyte solution has a high viscosity and is high in solvent holdablity, and yet has sufficiently high ionic conductivity. In the present invention, therefore, there can be obtained a secondary battery which is low in the possible reduction in battery properties caused by liquid leakage and vaporization and further low in internal resistance and high in output.

Next, description is made on the embodiment of the present invention with reference to FIG. 1.

FIG. 1 shows a general structure of the present secondary battery using an electrolyte solution consisting of a basic solvent containing an alkali metal salt and a halogenated polyolefin both dissolved therein. In FIG. 1, a positive electrode active material layer 2 and a negative electrode active material layer 3 are located so as to face each other via an electrolyte solution 1. At the back side of the positive electrode active material layer 2 is provided a positive electrode collector 4; at the back side of the negative electrode active material layer 3 is provided a negative electrode collector 5; at the side is provided a sealing member 6. Since the electrolyte solution is a basic solvent containing a halogenated polyolefin dissolved therein, the battery is low in the possible reduction in battery properties caused by liquid leakage and vaporization, low in internal resistance, and high in output.

Next, description is made on the secondary battery using a plastisol and the process for production of the battery.

Figure 2:
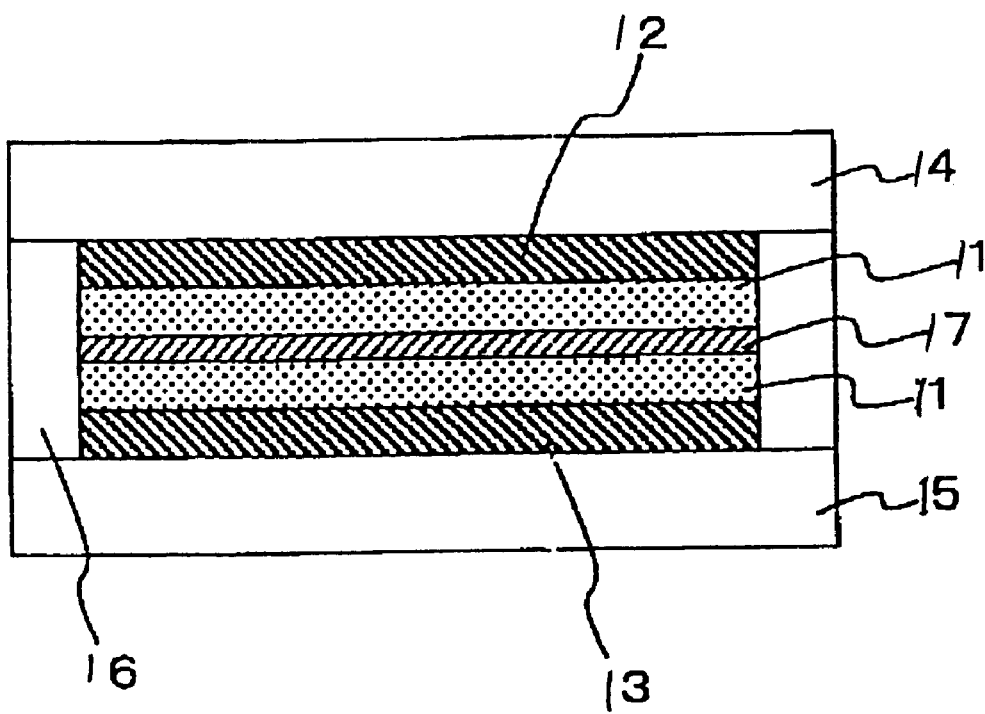
FIG. 2 is a sectional view showing an example of the constitution of the secondary battery of the present invention.

An example of the embodiment of the secondary battery using a plastisol, of the present invention is shown in FIG. 2. In the secondary battery shown in FIG. 2, a positive electrode layer 12 and a negative electrode layer 13 are laminated via a separator 17, and a plastisol 11 is filled between the positive electrode layer 12 and the negative electrode layer 13. The plastisol 11 is sealed by a sealing member 16; at the back sides of the positive electrode layer 12 and the negative electrode layer 13 are provided a positive electrode collector 14 and a negative electrode collector 15, respectively. It is preferred that a plastisol is introduced between a separator and a positive electrode layer and also between the separator and a negative electrode layer, as in the secondary battery of FIG. 2; however, the plastisol may be introduced only between the separator and the positive electrode layer or between the separator and the negative electrode layer.

In the present invention, the plastisol is a dispersion of a thermoplastic resin in a plasticizer. As the thermoplastic resin, there are preferably used, from the standpoint of, for example, the stability to the solvent of electrolyte solution, resins containing a polyolefin having halogen substituent such as F, Cl, Br or the like, for example, a halogenated polyolefin such as polyvinyl chloride, polyvinylidene chloride, polyvinylidene fluoride, polyhexafluoropropylene, polytetrafluoroethylene, polychlorotrifluoroethylene or the like.

Of these, preferred are resins containing a fluorinated polyolefin such as polyvinylidene fluoride, hexafluoropropylene, polytetrafluoroethylene, polychlorotrifluoroethylene or the like; particularly preferred is a copolymer containing tetrafluoroethylene. By using such a resin, the sites of separator which tends to cause breakage when an abnormally large current flows, are reinforced quickly; and the sites of separator already having breakage are repaired quickly. A polymer gel consisting of the above resin has good resistance to large current. Therefore, short-circuiting occurring inside the battery can be prevented more effectively. Incidentally, the "copolymer containing tetrafluoroethylene" refers to s copolymer containing tetrafluoroethylene as a constituent monomer, and is a copolymer obtained by copolymerizing tetrafluoroethylene and other monomer. In this case, the other monomer is preferred to be also a fluorine-containing monomer. An example of the copolymer containing tetrafluoroethylene is a copolymer of vinylidene fluoride and tetrafluoroethylene.

In the present invention, it is possible to add, to the plastisol, additives such as heat stabilizer, viscosity controlling-agent and the like, as necessary. In the present invention, it is also possible to use the thermoplastic resin in combination with a thermosetting resin as necessary, or to crystallize or crosslink part of the thermoplastic resin for insolubilization as necessary. In the present invention, there is no particular restriction as to the plasticizer, and any material capable of plasticizing the thermosetting resin can be used. However, a solvent is preferred from the standpoint of easiness of production of the present secondary battery. Preferred as the solvent are highly polar basic solvents usable in the electrolytic solution of secondary battery, such as ethylene carbonate, propylene carbonate, dimethyl carbonate, diethyl carbonate, methyl ethyl carbonate, γ-butyrolactone, N,N'-dimethylformamide, dimethyl sulfoxide, N-methylpyrrolidone, m-cresol and the like. In the present invention, these basic solvents can be used as the plasticizer singly or in combination of two or more kinds.

In the present invention, as the electrolyte salt contained in the plastisol, there can be used known electrolyte salts for secondary battery. As the electrolyte salt, there can be mentioned salts composed of a cation of alkali metal (e.g. Li, K or Na) and an anion of halogen-containing compound [e.g. $ClO_4^-$, $BF_4^-$, $PF_6^-$, $CF_3SO_3^{31}$, $(CF_3SO_2)_2N^-$, $(C_2F_5SO_2)_2N^-$, $(CF_3SO_2)_3C^-$ or $(C_2F_5SO_2)_3C^-$]. In the present invention, these electrolyte salts can be used singly or in combination of two or more kinds.

In the secondary battery of the present invention, there is no particular restriction as to the positive electrode active material as long as it absorbs positive ion or releases negative ion during discharge. As the positive electrode active material in the present invention, there can be used known positive electrode active materials for secondary battery, such as metal oxide (e.g. $LiMnO_2$, $LiMn_2O_4$, $LiCoO_2$ or $LiNiO_2$), conductive polymer or its derivative (e.g. polyacetylene, polyaniline, polypyrrole, polythiophene or polyparaphenylene), disulfide compound represented by general formula $(R—S_m)_n$ (R is an aliphatic or aromatic hydrocarbon; S is sulfur; m is an integer of 1 or larger; and n is an integer of 1 or larger) (e.g. dithioglycol, 2,5-dimercapto-1,3,4-thiadiazole or S-triazine-2,4,6-trithiol), and the like. In the present invention, the positive electrode active material may be mixed with an appropriate binder and/or an appropriate functional material to form a positive electrode. As the binder, there can be mentioned, for example, a halogen-containing polymer such as polyvinylidene fluoride or the like. As the functional material, there can be mentioned a conductive polymer for securing electronic conductivity (e.g. acetylene black, polypyrrole or polyaniline), a polymer electrolyte for securing ionic conductivity, a composite material thereof, etc. In the secondary battery of the present invention, there is no particular restriction as to the negative electrode active material as long as it can occlude and release cation. As the negative electrode active material, there can be used known negative electrode active materials for secondary battery, such as natural graphite, crystalline carbon (e.g. graphitized carbon) obtained by treating coal, petroleum pitch or the like at high temperatures), amorphous carbon obtained by heat-treating coal, petroleum pitch coke, acetylene pitch coke or the like, metallic lithium, lithium alloy (e.g. AlLi) and the like.

In the secondary battery of the present invention, it is possible to use a thin-film or reticulate collector composed of stainless steel, copper, nickel, aluminum or the like. In the present invention, the above-mentioned positive electrode and negative electrode are laminated via a separator made of a porous thermoplastic resin film or the like. As the material for the separator, there can be used known materials such as polyethylene, polypropylene and the like.

In the present invention, there is no particular restriction as to the method for production of the plastisol containing an electrolyte salt. The plastisol can be produced by mixing an alkali metal salt and a thermoplastic resin with a basic solvent, or by mixing an alkali metal salt and a thermoplastic resin separately with a basic solvent and mixing the two mixtures, or by dispersing a thermoplastic resin in a basic solvent and adding thereto an alkali metal salt, or by allowing a thermoplastic resin to swell using a low-boiling organic solvent, adding thereto a high-boiling basic solvent, and removing only the low-boiling organic solvent by vacuum distillation or the like. In the present invention, there is no particular restriction, either, as to the method for dispersing the thermoplastic resin or the like, and an ordinary means such agitating blade, homogenizer or the like can be used. Dispersion may also be conducted while applying an ultrasonic wave, or at a high temperature at a high pressure using an autoclave.

The secondary battery of the present invention. can be produced by introducing a plastisol containing an electrolyte salt, at least between a separator and a positive electrode or between the separator and a negative electrode. After the introduction of the plastisol, it is preferred to apply a voltage between the positive electrode layer and the negative electrode layer to heat part of the plastisol. Thereby, an excess current flows through the sites of short-circuiting or the sites which may cause short-circuiting and the plastisol at these sites are melted by the Joule's heat generated. By cooling, a polymer gel of low ionic conductivity is formed at the sites of short-circuiting or the sites which may cause short-circuiting, and these sites are repaired or reinforced. At the time of voltage application, the plastisol may be heated as a supplementary means. The heating temperature is preferably lower than the melting point of the plastisol, for example, about 30 to 90° C. There is no particular restriction as to the voltage applied between the positive electrode and the negative electrode but is, for example, 4 to 10 V.

In the present invention, as the methods for lamination of electrodes, taking out of lead, outer packaging, etc., there can be used those known in the production of secondary battery.

The secondary battery of the present invention can be used in a form of cylinder, prism, coin, sheet or the like, but the form is not restricted thereto. The present secondary battery can be produced and used by winding or laminating a positive electrode sheet, a separator, a negative electrode sheet, etc., inserting the resulting material into a case, dropping thereinto a plastisol containing an electrolyte salt, and conducting outer packaging with a known material such as metal case, resin case, laminate film or the like.

The detail of the present invention is described specifically below by way of Examples. However, the present invention is in no way restricted to these Examples.

EXAMPLE 1

In a glass vessel was placed 0.115 g, 2.3 g, 5.75 g, 23 g or 34.5 g of a vinylidene fluoride-tetrafluoroethylene copolymer (Kynar 7201 produced by Elf Atochem Japan, copolymerization ratio=70/30). Thereto was added 50 ml of tetrahydrofuran. The mixture was stirred at room temperature for 2 hours to obtain 5 kinds of solutions. To each solution was added 100 g of an ethylene carbonate-propylene carbonate mixed solution (mixing ratio=50/50). Each mixture was subjected to vacuum distillation at 65° C. to remove tetrahydrofuran, whereby were produced 5 kinds of solutions different in concentration of vinylidene fluoride-tetrafluoroethylene copolymer. To each solution was added 15 g of $LiPF_6$, and the mixture was stirred for dissolution to produce 5 kinds of electrolyte solutions containing 0.1% by weight, 2% by weight, 5% by weight, 20% by weight or 30% by weight of a vinylidene fluoride-tetrafluoroethylene copolymer.

In each electrolyte solution consisting of an ethylene carbonate-propylene carbonate mixture containing $LiPF_6$ and a vinylidene fluoride-tetrafluoroethylene copolymer both dissolved therein were dipped two mirror-polished platinum-blocked electrodes of 10 mm in diameter. The electrodes were connected to an electrochemical work station (Model 1604 of CH Instruments), and the electrolyte solution was measured for ionic conductivity at a frequency range of 0.1 Hz to 100 KHz at a voltage of 0.1 V. Each electrolyte solution was also measured for viscosity using a B type viscometer. Further, in order to examine the degree of leakage of each electrolyte solution, a filter paper (No. 5A) was fitted to a Kiriyama funnel; each electrolyte solution was poured into the funnel; and vacuum filtration was conducted at 1 mmHg for 5 minutes and the volume of the filtrate obtained was measured. The ionic conductivity, viscosity and amount of filtrate obtained for each electrolyte solution are shown in Table 1.

Of the above 5 kinds of electrolyte solutions, the electrolyte solution containing 5% by weight of a vinylidene fluoride-tetrafluoroethylene copolymer was used to produce a secondary battery. First, there were mixed lithium cobaltate having an average particle diameter of 5 $\mu$m, acetylene black, a polyvinylidene fluoride and N-methyl-2-pyrrolidone at a weight ratio of 10:1:1:30 to obtain a dispersion. The dispersion was uniformly coated on one side of an aluminum foil by a wire bar method, followed by vacuum-drying at 100° C. for 2 hours to remove the solvent. The thin layer obtained was cut into an appropriate size to produce a positive electrode layer having a capacity of about 25 mAh. On this positive electrode layer was laminated a separator film made of a polyethylene, having a thickness of 25 $\mu$m and a porosity of 50%. On the laminated film was cast a slurry obtained by mixing a polyvinylidene fluoride, N-methyl-2-pyrrolidone, a petroleum coke powder and acetylene black at a weight ratio of 1:30:20:1; the coated slurry was made uniform by a wire bar method; and vacuum drying was conducted at 100° C. for 2 hours to produce a negative electrode layer. Then, on the negative electrode layer was placed, as a collector, a copper foil having the same area as the aluminum foil of positive electrode; the resulting material was wound a plurality of times and accommodated in a metal case. Lastly, into the metal case was dropped the electrolyte solution containing 10% by weight of a vinylidene fluoride-tetrafluoroethylene copolymer; and the metal case was sealed with an adhesive to complete a secondary battery. The secondary battery was subjected to a charge-discharge test. As a result, the charge-discharge efficiency was 99% or more at a discharge rate of 2.5 mA and 95% even at a discharge rate of 25 mA. Further, even at −10° C., a good charge-discharge efficiency of 60% was obtained at a discharge rate of 2.5 mA. A charge-discharge test was repeated 100 times at a constant current of 5 mA between 4.1 V and 2.0 V. As a result, there was substantially no change in capacity, and good properties were observed.

COMPARATIVE EXAMPLE 1

In the same glass vessel as used in Example 1 was placed 100 g of an ethylene carbonate-propylene carbonate mixed solution (mixing ratio=50/50) alone. Thereto was added 15 g of $LiPF_6$. The mixture was stirred for dissolution to produce an electrolyte solution.

The electrolyte solution was measured for ionic conductivity in the same manner as in Example 1. The electrolyte solution was also measured for viscosity and amount of filtrate. The results are shown in Table 1 together with the results of Example 1. As compared with Example 1, the ionic conductivity was about equivalent, but the viscosity was small and the amount of filtrate was striking large. Therefore, the secondary battery using the above electrolyte solution was found to have (1) a high possibility of liquid leakage when the battery has come to possess flaws in sealing and (2) inferior safety.

EXAMPLE 2

Five kinds of solutions containing a vinylidene fluoride-hexafluoropropylene copolymer (Kynar 2801 produced by Elf Atochem Japan, copolymerization ratio=90/10) in different concentrations were produced in the same manner as in Example 1 except that the vinylidene fluoride-tetrafluoroethylene copolymer used in Example 1 was replaced by the above vinylidene fluoride-hexafluoropropylene copolymer. In the same manner as in Example 1, 15 g of $LiPF_6$ was added to each solution and the mixture was stirred for dissolution to produce 5 kinds of electrolyte solutions containing 0.1% by weight, 2% by weight, 5% by weight, 20% by weight or 30% by weight of a vinylidene fluoride-hexafluoropropylene copolymer.

The electrolyte solutions were measured for ionic conductivity in the same manner as in Example 1. The electrolyte solutions were also measured for viscosity and amount of filtrate. The results are shown in Table 1 together with the results of Example 1.

Next, of the above electrolyte solutions, the electrolyte solution containing 20% by weight of a vinylidene fluoride-hexafluoropropylene copolymer was used to produce a secondary battery. First, a positive electrode layer having a capacity of about 25 mAh was produced in the same manner as in Example 1. On this positive electrode layer was laminated a separator film in the same manner as in Example 1, after which a negative electrode layer was formed in the same manner as in Example 1. Then, a copper foil was placed on the negative electrode layer in the same manner as in Example 1. The resulting material was wound a plurality of times and accommodated in a metal case. Lastly, into the metal case was dropped the electrolyte solution containing 20% by weight of a vinylidene fluoride-hexafluoropropylene copolymer; and the metal case was sealed with an adhesive to complete a secondary battery. The secondary battery was subjected to a charge-discharge test. As a result, the charge-discharge efficiency was 99% or more at a discharge rate of 2.5 mA and 96% even at a discharge rate of 25 mA. Further, even at −10° C., a good charge-discharge efficiency of 75% was obtained at a discharge rate of 2.5 mA. A charge-discharge test was repeated 100 times at a constant current of 5 mA between 4.1 V and 2.0 V. As a result, there was substantially no change in capacity, and good properties were observed.

EXAMPLE 3

Five kinds of solutions containing a vinylidene fluoride-chlorotrifluoroethylene copolymer (copolymerization ratio=90/10) in different concentrations were produced in the same manner as in Example 1 except that the vinylidene fluoride-tetrafluoroethylene copolymer used in Example 1 was replaced by the above vinylidene fluoride-chlorotrifluoroethylene copolymer. In the same manner as in Example 1, 15 g of $LiPF_6$ was added to each solution and the mixture was stirred for dissolution to produce 5 kinds of electrolyte solutions containing 0.1% by weight, 2% by weight, 5% by weight, 20% by weight or 30% by weight of a vinylidene fluoride-chlorotrifluoroethylene copolymer.

The electrolyte solutions were measured for ionic conductivity in the same manner as in Example 1. The electrolyte solutions were also measured for viscosity and amount of filtrate. The results are shown in Table 1 together with the results of Example 1.

Next, of the above electrolyte solutions, the electrolyte solution containing 20% by weight of a vinylidene fluoride-chlorotrifluoroethylene copolymer was used to produce a secondary battery. First, a positive electrode layer having a capacity of about 25 mAh was produced in the same manner as in Example 1. On this positive electrode layer was laminated a separator film in the same manner as in Example 1, after which a negative electrode layer was formed in the same manner as in Example 1. Then, a copper foil was placed on the negative electrode layer in the same manner as in Example 1. The resulting material was wound a plurality of times and accommodated in a metal case. Lastly, into the metal case was dropped the electrolyte solution containing 20% by weight of a vinylidene fluoride-chlorotrifluoroethylene copolymer; and the metal case was sealed with an adhesive to complete a secondary battery. The secondary battery was subjected to a charge-discharge test. As a result, the charge-discharge efficiency was 99% or more at a discharge rate of 2.5 mA and 95% even at a discharge rate of 25 mA. Further, even at −10° C., a good charge-discharge efficiency of 72% was obtained at a discharge rate of 2.5 mA. A charge-discharge test was repeated 100 times at a constant current of 5 mA between 4.1 V and 2.0 V. As a result, there was substantially no change in capacity, and good properties were observed.

EXAMPLE 4 n-Decane was added, in a concentration of 2% by weight, to each of the three different electrolyte solutions produced in Examples 1 to 3, each consisting of an ethylene carbonate-propylene carbonate mixed solution (mixing ratio=50/50) containing 15 g of $LiPF_6$ and 20% by weight of a vinylidene fluoride-tetrafluoroethylene copolymer, a vinylidene fluoride-hexafluoropropylene copolymer or a vinylidene fluoride-chlorotrifluoroethylene copolymer.

The above-obtained electrolyte solutions were measured for ionic conductivity in the same manner as in Example 1. The electrolyte solutions were also measured for viscosity and amount of filtrate. The results are shown in Table 2.

Next, the above 3 kinds of electrolyte solutions were used to produce three kinds of secondary batteries. First, a positive electrode layer having a capacity of about 25 mAh was produced in the same manner as in Example 1. On this positive electrode layer was laminated a separator film in the same manner as in Example 1, after which a negative electrode layer was formed in the same manner as in Example 1. Then, a copper foil was placed on the negative electrode layer in the same manner as in Example 1. The resulting material was wound a plurality of times and accommodated in a metal case. Lastly, into the metal case was dropped the electrolyte solution containing a vinylidene fluoride-tetrafluoroethylene copolymer and n-decane; and the metal case was sealed with an adhesive to complete a secondary battery. There were also produced two secondary batteries using a vinylidene fluoride-hexafluoropropylene copolymer or a vinylidene fluoride-chlorotrifluoroethylene copolymer in place of the vinylidene fluoride-tetrafluoroethylene copolymer. The three secondary batteries were subjected to a charge-discharge test. As a result, the charge-discharge efficiencies were each 99% or more at a discharge rate of 2.5 mA and 95% or more even at a discharge rate of 25 mA. Further, even at −10° C., good charge-discharge efficiencies of 70% or more were obtained at a discharge rate of 2.5 mA. A charge-discharge test was repeated 100 times at a constant current of 5 mA between 4.1 V and 2.0 V. As a result, there was substantially no change in capacity and good properties were observed, in all the secondary batteries.

The electrolyte solution of the present invention can be used as an electrolytic solution not only for secondary battery but also for electrochemical apparatuses such as primary battery, electric double layer capacitor, electrolytic capacitor, various sensors and the like.

TABLE 1

| Polymer | Polymer concentration (wt. %) | Ionic conductivity (mS/cm) | Viscosity (cps) | Amount of filtrate (wt. %) |
|---|---|---|---|---|
| Example 1 | | | | |
| Vinylidene fluoride-tetrafluoroethylene copolymer | 0.1 | 12.1 | 180 | 23 |
| | 2 | 12.3 | 340 | 18 |
| | 5 | 12.1 | 410 | 15 |
| | 20 | 10.5 | 1600 | 5 |
| | 30 | 7.5 | 3500 | 5 |
| Example 2 | | | | |
| Vinylidene fluoride-hexafluoropropylene copolymer | 0.1 | 12.5 | 220 | 18 |
| | 2 | 11.2 | 480 | 19 |
| | 5 | 12.3 | 800 | 12 |
| | 20 | 11.5 | 3500 | 4 |
| | 30 | 8.8 | 7000 | 3 |
| Example 3 | | | | |
| Vinylidene fluoride-chlorotrifluoroethylene copolymer | 0.1 | 12.8 | 200 | 20 |
| | 2 | 12.0 | 400 | 16 |
| | 5 | 11.9 | 650 | 13 |
| | 20 | 9.2 | 1900 | 5 |
| | 30 | 6.8 | 4500 | 5 |
| Comparative Example 1 | | | | |
| Not used | | 0 | 13.2 | 150 | 45 |

TABLE 2

| Polymer | Ionic conductivity (mS/cm) | Viscosity (cps) | Amount of filtrate (wt. %) |
|---|---|---|---|
| Vinylidene fluoride-tetrafluoroethylene copolymer | 10.5 | 1800 | 2 |
| Vinylidene fluoride-hexafluoropropylene copolymer | 11.5 | 4100 | 2 |
| Vinylidene fluoride-chlorotrifluoroethylene copolymer | 9.2 | 2200 | 2 |

EXAMPLE 5

In a glass vessel was placed 0.115 g, 2.3 g, 5.75 g, 23 g or 34.5 g of a vinylidene fluoride-tetrafluoroethylene copolymer powder (Kynar 7201 produced by Elf Atochem Japan, copolymerization molar ratio=70/30). Thereto was added 100 g of an ethylene carbonate-propylene carbonate mixed solution (mixing ratio=50/50). Each mixture was stirred to produce 5 kinds of plastisols containing a vinylidene fluoride-tetrafluoroethylene copolymer in a dispersed form. To each plastisol was added 15 g of $LiPF_6$, and the mixture was stirred for dissolution to produce 5 kinds of electrolyte plastisols containing 0.1% by weight, 2% by weight, 5% by weight, 20% by weight or 30% by weight of a vinylidene fluoride-tetrafluoroethylene copolymer.

In each electrolyte plastisol produced above were dipped two mirror-polished platinum-blocked electrodes of 10 mm in diameter. The electrodes were connected to an electrochemical work station (Model 1604 of CH Instruments), and the electrolyte plastisol was measured for ionic conductivity at a frequency range of 0.1 Hz to 100 KHz at a voltage of 0.1 V. The results obtained are shown in Table 3.

TABLE 3

| | Polymer | Polymer concentration (wt. %) | Ionic conductivity (mS/cm) |
|---|---|---|---|
| Example 5 | Vinylidene fluoride-tetrafluoroethylene copolymer | 0.1 | 13.2 |
| | | 2 | 13.1 |
| | | 5 | 12.9 |
| | | 20 | 12.9 |
| | | 30 | 12.6 |
| Example 6 | Vinylidene fluoride-hexafluoropropylene copolymer | 0.1 | 13.0 |
| | | 2 | 12.5 |
| | | 5 | 12.1 |
| | | 20 | 11.8 |
| | | 30 | 11.5 |
| Example 7 | Vinylidene fluoride-chlorotrifluoroethylene copolymer | 0.1 | 13.2 |
| | | 2 | 13.0 |
| | | 5 | 12.8 |
| | | 20 | 12.0 |
| | | 30 | 12.1 |
| Comparative Example 2 | Not used | 0 | 13.2 |

Of the above 5 kinds of electrolyte plastisols, the electrolyte plastisol containing 5% by weight of a vinylidene fluoride-tetrafluoroethylene copolymer was used to produce a secondary battery. First, there were mixed lithium cobaltate having an average particle diameter of 5 $\mu$m, acetylene black, a polyvinylidene fluoride and N-methyl-2-pyrrolidone at a weight ratio of 10:1:1:30 to obtain a dispersion. The dispersion was uniformly coated on one side of an aluminum foil by a wire bar method, followed by vacuum-drying at 100° C. for 2 hours to remove the solvent.

The thin layer obtained was cut into an appropriate size to produce a positive electrode layer having a capacity of about 25 mAh. On this positive electrode layer was laminated a separator film having a thickness of 25 μm and a porosity of 50%, made of a polyethylene having, at various locations, holes of 0.1 mm in diameter forcibly formed as flaws. On the laminated film was cast a slurry obtained by mixing a polyvinylidene fluoride, N-methyl-2-pyrrolidone, a petroleum coke powder and acetylene black at a weight ratio of 1:30:20:1; the coated slurry was made uniform by a wire bar method; and vacuum drying was conducted at 100° C. for 2 hours to produce a negative electrode layer. Then, on the negative electrode layer was placed, as a collector, a copper foil having the same area as the aluminum foil of positive electrode; the resulting material was wound a plurality of times and accommodated in a metal case. Thereafter, into the metal case was dropped the electrolyte plastisol containing 5% by weight of a vinylidene fluoride-tetrafluoroethylene copolymer; and the metal case was sealed with an adhesive to complete a secondary battery. Lastly, the secondary battery was heated to 80° C. and kept for 1 hour while applying a voltage of 4.3 V. The resulting secondary battery was subjected to a charge-discharge test. As a result, the charge-discharge efficiency was 99% or more at a discharge rate of 2.5 mA and 95% even at a discharge rate of 25 mA. Further, even at −10° C., a good charge-discharge efficiency of 60% was obtained at a discharge rate of 2.5 mA. A charge-discharge test was repeated 100 times at a constant current of 5 mA between 4.1 V and 2.0 V. As a result, there was substantially no change in capacity, and good properties were observed. In this battery there was observed neither incomplete voltage increase during charging nor phenomenon (e.g. self-discharging) which seemed to be caused by partial short-circuiting.

COMPARATIVE EXAMPLE 2

In the same glass vessel as used in Example 5 was placed 100 g of an ethylene carbonate-propylene carbonate mixed solution (mixing ratio=50/50) alone. Thereto was added 15 g of $LiPF_6$. The mixture was stirred for dissolution to produce an electrolyte solution.

The electrolyte solution was measured for ionic conductivity in the same manner as in Example 5. A positive electrode layer was produced in the same manner as in Example 5. On this positive electrode layer was laminated a separator film of 25 μm in thickness and 50% in porosity, made of a polyethylene having, at various locations, holes of 0.1 mm in diameter forcibly formed as flaws. Then, a negative electrode layer and a collector were formed and the resulting material was wound a plurality of times and accommodated in a metal case, in the same manner as in Example 5. Thereafter, into the metal case was dropped the electrolyte solution produced above, containing no vinylidene fluoride-tetrafluoroethylene copolymer, and the metal case was sealed with an adhesive to complete a secondary battery. This secondary battery was subjected to a charge-discharge test. When charging was conducted at a constant current of 2.5 mA, the voltage did not increase to 4.1 V or higher and self-discharging was high; therefore, the presence of internal short-circuiting was predicted.

EXAMPLE 6

Five kinds of electrolyte plastisols containing 0.1% by weight, 2% by weight, 5% by weight, 20% by weight or 30% by weight of a vinylidene fluoride-hexafluoropropylene copolymer (Kynar 2801 produced by Elf Atochem Japan, copolymerization molar ratio=90/10) were produced in the same manner as in Example 5 except that the vinylidene fluoride-tetrafluoroethylene copolymer used in Example 5 was replaced by the above vinylidene fluoride-hexafluoropropylene copolymer. In the same manner as in Example 5, 15 g of $LiPF_6$ was added to each plastisol and the mixture was stirred for dissolution to produce 5 kinds of electrolyte plastisols.

The electrolyte plastisols were measured for ionic conductivity in the same manner as in Example 5. Of the above 5 kinds of electrolyte plastisols, the electrolyte plastisol containing 20% by weight of a vinylidene fluoride-hexafluoropropylene copolymer was used to produce a secondary battery. First, a positive electrode layer was produced in the same manner as in Example 5. On this positive electrode layer was laminated a separator film having a thickness of 25 μm and a porosity of 50%, made of a polyethylene having, at various locations, holes of 0.1 mm in diameter forcibly formed as flaws. A negative electrode layer and a collector were produced in the same manner as in Example 5, and the resulting material was wound a plurality of times and accommodated in a metal case. Thereafter, into the metal case was dropped the electrolyte plastisol containing 20% by weight of a vinylidene fluoride-hexafluoropropylene copolymer; and the metal case was sealed with an adhesive to complete a secondary battery. Lastly, the secondary battery was heated to 80° C. and kept for 1 hour while applying a voltage of 4.3 V. The resulting secondary battery was subjected to a charge-discharge test. As a result, the charge-discharge efficiency was 99% or more at a discharge rate of 2.5 mA and 95% even at a discharge rate of 25 mA. Further, even at −10° C., a good charge-discharge efficiency of 60% was obtained at a discharge rate of 2.5 mA. A charge-discharge test was repeated 100 times at a constant current of 5 mA between 4.1 V and 2.0 V. As a result, there was substantially no change in capacity, and good properties were observed. In this battery there was observed neither incomplete voltage increase during charging nor phenomenon (e.g. self-discharging) which seemed to be caused by partial short-circuiting.

EXAMPLE 7

Five kinds of electrolyte plastisols containing 0.1% by weight, 2% by weight, 5% by weight, 20% by weight or 30% by weight of a vinylidene fluoride-chlorotrifluoroethylene copolymer (copolymerization molar ratio=90/10) were produced in the same manner as in Example 5 except that the vinylidene fluoride-tetrafluoroethylene copolymer used in Example 5 was replaced by the above vinylidene fluoride-chlorotrifluoroethylene copolymer. In the same manner as in Example 5, 15 g of $LiPF_6$ was added to each plastisol and the mixture was stirred for dissolution to produce 5 kinds of electrolyte plastisols.

The electrolyte plastisols were measured for ionic conductivity in the same manner as in Example 5. Of the above 5 kinds of electrolyte plastisols, the electrolyte plastisol containing 20% by weight of a vinylidene fluoride-chlorotrifluoroethylene copolymer was used to produce a secondary battery. First, a positive electrode layer was produced in the same manner as in Example 5. On this positive electrode layer was laminated a separator film having a thickness of 25 μm and a porosity of 50%, made of a polyethylene having, at various locations, holes of 0.1 mm in diameter forcibly formed as flaws. A negative electrode layer and a collector were produced in the same manner as in Example 5, and the resulting material was wound a plurality of times and accommodated in a metal case. Thereafter, into the metal case was dropped the electrolyte plastisol containing 20% by weight of a vinylidene fluoride-chlorotrifluoroethylene copolymer; and the metal case was sealed with an adhesive to complete a secondary battery. Lastly, the secondary battery was heated to 80° C. and kept for 1 hour while applying a voltage of 4.3 V. The resulting secondary battery was subjected to a charge-discharge test. As a result, the charge-discharge efficiency was 99% or more at a discharge rate of 2.5 mA and 95% even at a discharge rate of 25 mA. Further, even at −10° C., a good charge-discharge efficiency of 60% was obtained at a discharge rate of 2.5 mA. A charge-discharge test was repeated 100 times at a constant current of 5 mA between 4.1 V and 2.0 V. As a result, there was substantially no change in capacity, and good properties were observed. In this battery there was observed neither incomplete voltage increase during charging nor phenomenon (e.g. self-discharging) which seemed to be caused by partial short-circuiting.

The electrolyte plastisol used in the secondary battery of the present invention can be utilized as an electrolyte for primary battery, electric double layer capacitor, electrolytic capacitor, various sensors, etc.

What is claimed is:

1. A secondary battery using an alkali metal ion as a charge carrier and having a structure in which a positive electrode and a negative electrode are adjacent to each other via an electrolyte solution, in which secondary battery the electrolyte solution consists of a basic solvent containing an alkali metal salt and a halogenated polyolefin and an aliphatic polyolefin all dissolved therein.

2. A secondary battery according to claim 1, wherein the halogenated polyolefin is a fluorinated polyolefin.

3. A secondary battery according to claim 2, wherein the fluorinated polyolefin is a copolymer containing tetrafluoroethylene.

4. A secondary battery according to claim 1, wherein the halogenated polyolefin is contained in a concentration of 0.1 to 20% by weight.

5. A secondary battery according to claim 1, wherein the aliphatic polyolefin is a saturated hydrocarbon having a carbon chain length of 6 to 24.

6. A secondary battery according to claim 1, wherein the aliphatic polyolefin is contained in a concentration smaller than that of the halogenated polyolefin.

* * * * *